United States Patent [19]

Ingle et al.

[11] Patent Number: 5,124,393
[45] Date of Patent: Jun. 23, 1992

[54] LATEX PAINTS

[75] Inventors: David M. Ingle, Riverside; Gaylen M. Knutson, Yorba Linda, both of Calif.

[73] Assignee: Union Oil Company of California, Los Angeles, Calif.

[21] Appl. No.: 516,241

[22] Filed: Apr. 30, 1990

Related U.S. Application Data

[63] Continuation-in-part of Ser. No. 399,868, Aug. 29, 1989.

[51] Int. Cl.$^5$ .............................................. C08L 31/02
[52] U.S. Cl. .................................... 524/458; 524/555; 524/558; 524/560; 525/903
[58] Field of Search ............... 524/458, 555, 558, 560; 525/903

[56] References Cited

U.S. PATENT DOCUMENTS

| | | | |
|---|---|---|---|
| Re. 31,936 | 7/1985 | Sperry et al. | 524/522 |
| 3,509,085 | 4/1970 | Sekmakas | 260/29.6 |
| 3,594,337 | 7/1971 | Shea | 525/218 |
| 3,616,166 | 10/1971 | Kelley | 525/218 |
| 3,843,584 | 10/1974 | Turck | 260/29.7 |
| 4,172,177 | 10/1979 | Sato | 526/312 |
| 4,219,454 | 8/1980 | Iacoviello et al. | 260/29.6 |
| 4,395,524 | 7/1983 | Emmens et al. | 526/307.2 |
| 4,406,660 | 9/1983 | Beiner | 526/318.25 |
| 4,455,342 | 6/1984 | Fink | 524/555 |
| 4,522,972 | 6/1985 | Mondt et al. | 524/548 |
| 4,554,337 | 11/1985 | Krinski | 527/201 |
| 4,647,396 | 3/1987 | Denziner et al. | 526/318.2 |
| 4,686,260 | 8/1987 | Lindemann et al. | 525/903 |
| 4,722,965 | 2/1988 | Wong et al. | 526/302 |
| 4,725,655 | 2/1988 | Denzinger et al. | 526/318.2 |
| 4,737,549 | 4/1988 | Bomer et al. | 526/318.2 |
| 4,743,498 | 5/1988 | Kedrowski | 428/288 |
| 4,808,660 | 2/1989 | Schmeing et al. | 524/812 |
| 4,855,349 | 8/1989 | Ingle | 524/432 |

FOREIGN PATENT DOCUMENTS

| | | | |
|---|---|---|---|
| 224736 | 6/1987 | European Pat. Off. | |
| 0302588 | 8/1989 | European Pat. Off. | |
| 090870 | 7/1981 | Japan | 524/501 |
| 160634 | 10/1982 | Japan | |

OTHER PUBLICATIONS

Grant, J. "Hackh's Chemical Dictionary", 4th Ed. McGraw-Hill, New York, 1969, p. 703.

Primary Examiner—Joseph L. Schofer
Assistant Examiner—Jeffrey T. Smith
Attorney, Agent, or Firm—Gregory F. Wirzbicki; Shlomo R. Frieman

[57] ABSTRACT

The ICI viscosity of a paint is improved by incorporating into the paint a binder that comprises, in part, a supplemental polymer. The supplemental polymer comprises about 20 to about 60 weight percent of a substantially non-self-polymerizable monomer and about 40 to about 80 weight percent of a copolymerizable monomer having a water-soluble homopolymer. The supplemental polymer and binder are substantially inseparable by chromatographic means.

23 Claims, No Drawings

LATEX PAINTS

CROSS-REFERENCE TO RELATED APPLICATION

This application is a continuation-in-part of application Ser. No. 07/399,868, filed Aug. 29, 1989, which application is incorporated herein by reference in its entirety.

BACKGROUND

The present invention relates to latex paints.

Latex paints are a mixture of a multitude of ingredients. Typical ingredients include coalescing aids, thickening aids, dispersing aids, defoamers, biocides, pigments, and binders. The large numbers of ingredients makes it difficult to formulate latex paints. In addition, optional ingredients are also employed in latex formulations to enhance various paint properties. For example, rheology modifiers are employed to enhance a paint's film-build characteristics. Film-build influences the hiding power of a paint, i.e., film-build is an indication of how well one coat of the paint covers a surface. Since flat latex paints are generally applied over a much larger surface area, e.g., wall and ceiling surfaces, than the surface areas typically covered by semi-gloss latex paints, e.g., trim, film-build characteristics are especially important in flat latex paints.

However, use of rheology modifiers in paint formulations tends (a) to make it more difficult to formulate latex paints and (b) to adversely affect other latex paint properties.

SUMMARY OF THE INVENTION

The present invention provides a latex paint capable of exhibiting good film-build characteristics. The paint inherently possesses good rheology so that the use of separate rheology modifiers for improved film build is unnecessary. This result is achieved by employing in the paint a binder that comprises a supplemental polymer. Generally, the supplemental polymer is present in the binder in a concentration of about 0.5 to about 10, preferably about 1 to about 7, and more preferably about 1.5 to about 5, weight percent based on the total dry weight of the binder.

The supplemental polymer comprises about 20 to about 60 weight percent of a substantially non-self-polymerizable monomer, and about 40 to about 80 weight percent of a copolymerizable monomer having a water-soluble homopolymer. As used in the specification and claims, the term "substantially non-self-polymerizable monomer" means a copolymerizable monomer that does not give high yields (i.e., yields greater than about 95 weight percent, and preferably greater than about 85 weight percent) of high molecular weight (i.e., greater than about 2,000 weight average $M_w$) homopolymer when reacted for about 3 hours at about 90° C. in the presence of about 1 weight percent potassium persulfate; and the term "water-soluble homopolymer" means a homopolymer that is dissolvable in water at a temperature of about 25° C. and at a concentration of at least about 25 g homopolymer per 100 ml water.

The invention also encompasses a film formed by drying the paint, and an article having a portion of its surface coated with the film.

DETAILED DESCRIPTION OF THE INVENTION

The supplemental polymer employed in the paint of the present invention comprises about 20 to about 60 weight percent of a substantially non-self-polymerizable monomer, and about 40 to about 80 weight percent of a copolymerizable monomer having a water-soluble homopolymer. Preferably, the supplemental polymer comprises about 30 to about 50 weight percent of the non-self-polymerizable monomer, and about 50 to about 70 weight percent of the copolymerizable monomer. More preferably, about 35 to about 45 weight percent of the non-self-polymerizable monomer and about 55 to about 65 weight percent of the copolymerizable monomer are present in the supplemental polymer.

Exemplary non-self-polymerizable monomers include, but are not limited to, compounds having the formula I

wherein $R_1$ is hydroxy, alkoxy, or amino, $R_2$ is hydrogen or $CH_2COZ_1$, $R_3$ and $R_4$ are independently hydrogen or $COZ_2$, and $Z_1$ and $Z_2$ are independently hydroxy, alkoxy, or amino. Preferably, the compound of formula I contains no more than a total of three, and more preferably no more than a total of two, amino and/or carboxylic acid groups. Each alkoxy moiety generally contains from 1 to about 8 carbon atoms, and preferably from 1 to about 2 carbon atoms. Most preferably, $R_1$, $Z_1$, and $Z_2$ are hydroxy. One or more different compounds of formula I can be present in the polymer.

Illustrative compounds of formula I are itaconic acid, maleic acid, fumaric acid, itaconate esters, maleate esters, dimethylmaleate, and fumarate esters. Preferably, the non-self-polymerizable monomer is an acid-containing monomer, and most preferably is itaconic acid.

Typical copolymerizable monomers include, but are not limited to, N-vinyl lactams having the formula II

wherein m is an integer from about 3 to about 5 (preferably 3 or 4), and glycol acrylates having the formula III and glycol acrylamides having the formula IV

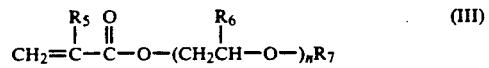

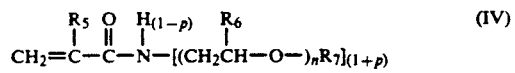

wherein $R_5$ and $R_6$ are independently hydrogen or methyl, $R_7$ is hydrogen or an alkyl group preferably containing 1 to about 30 carbon atoms, n is an integer from 1 to about 30, and p is either 0 or 1. More preferably, $R_7$ is hydrogen or an alkyl group containing about 12 to about carbon atoms. When $R_7$ is hydrogen, n is preferably 1, and when $R_7$ is an alkyl group containing about 12 to about 24 carbon atoms, n is preferably within the range of about 20 to about 30.

The most preferred glycol acrylates, and the most preferred copolymerizable monomers are 2-hydroxyethyl acrylate and 2-hydroxyethyl methacrylate. In addition, a single copolymerizable monomer or a mixture of the copolymerizable monomers can be present in the polymer.

Optionally, the supplemental polymer comprises ethylene, a vinyl monomer, an alkyl acrylate monomer, a N-alkyl acrylamide monomer, an alkenyl aromatic monomer, and/or an alkadiene monomer. Typical vinyl monomers include, but are not limited to, vinyl halides, vinylidene halides, vinyl acetate, and acrylonitrile. Chlorine and bromine are exemplary halide moieties of vinyl halide and vinylidene halide monomers.

The alkyl acrylate monomers generally have the formula V

(V)

and N-alkyl acrylamide monomers generally have the formula VI

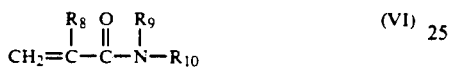
(VI)

wherein $R_8$ is selected from the group consisting of hydrogen, alkyl groups containing 1 to about 6 carbon atoms, and halo-substituted alkyl groups containing 1 to about 6 carbon atoms, and $R_9$ and $R_{10}$ are each an alkyl group independently containing up to about 18 carbon atoms. Preferably $R_8$ is selected from the group containing hydrogen and methyl, and $R_9$ and $R_{10}$ are each an alkyl group independently containing up to about 8 carbon atoms. Preferred alkyl acrylate monomers are selected from the group consisting of methyl acrylate, methyl methacrylate, ethyl acrylate, ethyl methacrylate, and mixtures thereof. N-ethyl acrylamide, N-methyl acrylamide, and N,N-dimethyl acrylamide, as well as mixtures of these monomers, are the preferred N-alkyl acrylamide monomers.

As used in the specification and claims, "alkenyl aromatic monomers" are defined as any organic compound containing at least one aromatic ring and at least one aliphatic-containing moiety having alkenyl unsaturation. Preferred alkenyl aromatic monomers are represented by the formula VII

(VII)

wherein X is an aliphatic radical containing at least one alkenyl bond, Y is a substituent on the aromatic ring, and n is the number of Y substituents on the ring, n being an integer from 0 to 5. Generally, X comprises at least 2 carbon atoms, but usually no more than about 6, and preferably no more than about 3 carbon atoms. X is preferably a substituted or unsubstituted alkenyl group. Preferred alkenyl group substituents are halogen radicals, e.g., chloride. However, the most preferred alkenyl group is unsubstituted, i.e., a hydrocarbon, and contains only one olefinic unsaturation. Ethenyl is the most preferred X.

Y is an organic or inorganic radical. When n is 2 or more, Y can be the same or different. If organic, Y generally contains from 1 to about 15 carbon atoms and, preferably, is an aliphatic radical. Even more preferably, Y is a saturated aliphatic radical. If inorganic, Y is preferably a halogen. Exemplary Y substituents include halo and cyano radicals and substituted and unsubstituted alkyl radicals of 1 to about 10 carbon atoms. Preferred Y substituents are chloride and unsubstituted alkyl groups of 1 to about 6 carbon atoms. Y is more preferably a chloride radical and $C_1$ an $C_4$ unsubstituted alkyl radicals.

Illustrative alkenyl aromatic monomers include styrene, α-methyl styrene, o-methyl styrene, p-methyl styrene, o,p-dimethyl styrene, o,p-diethyl styrene, p-chlorostyrene, isopropyl styrene, t-butyl styrene, o-methyl-p-isopropyl styrene, o,p-dichlorostyrene, and mixture thereof. Due to its commercial availability and low cost, styrene is the preferred alkenyl aromatic monomers.

Exemplary alkadiene monomers have the formula VIII

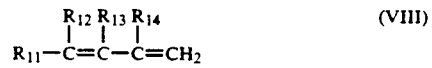
(VIII)

wherein $R_{11}$, $R_{12}$, $R_{13}$, an $R_{14}$ are each independently selected from the group consisting of hydrogen, halogen, and alkyl radicals containing 1 to about 2 carbon atoms. Commercially available alkadiene monomers include butadiene, isoprene, 1,3-pentadiene, 2-ethyl butadiene, and 4-methyl-1,3-pentadiene. The preferred alkadiene monomer is butadiene.

Although the optional monomers can comprise up to about 40 weight of the supplemental polymer, the optional monomers preferably comprise about 1 to about 30 weight percent, more preferably about 1 to about 25 weight percent, of the supplemental polymer The non-self-polymerizable monomer, the copolymerizable monomer, and the optional monomers (when employed) together generally constitute at least about 95 weight percent of the supplemental polymer, and preferably at least about 98 weight percent of the supplemental polymer. In fact, it is frequently the case that the only additional ingredients present in the supplemental polymer are substances (e.g., surfactants, initiators) that are employed to aid in polymerizing the monomers.

The supplemental polymer is made, for example, by charging the monomeric ingredients, water, and a surfactant (when employed) into a reaction vessel, purging the reaction vessel with an inert gas, e.g., nitrogen, to remove essentially all the oxygen from the reactor vessel, and heating the reactor vessel to the reaction temperature, e.g. from about 80° to about 100° C. When the reactor vessel reaches the desired reaction temperature, an initiator is then added to the reaction vessel, and the reaction is continued for about 2 to about 4 hours. After the reaction is completed, the reactor vessel is cooled. This synthesis yields an aqueous polymeric composition comprising the supplemental polymer in water. In some instances, the aqueous polymeric composition has the appearance of a milky emulsion, while in other instances it looks like a clear solution.

Anionic, nonionic, and amphoteric surfactants can be employed in the supplemental polymer synthesis process. Exemplary anionic, nonionic, and amphoteric surfactants are Siponate A246L brand surfactant available from Alcolac, polyoxyethylene alkyl phenol surfactants, and N,N-biscarboxyethyl lauramine, respectively. However in some instances, no surfactant is required.

Typical initiators include thermally generated free radical sources such as persulfates, perphosphates, and hydrogen peroxide. Generally, the initiator is employed in a concentration of about 0.5 to about 2 parts per hundred parts monomer by weight (phm), and preferably in a concentration of about 0.75 to about 1.25 phm.

The supplemental polymer can also be made in a non-aqueous solution using techniques well known to those skilled in the art. However, due to environmental and cost considerations, it is preferred that the supplemental polymer be prepared by an aqueous emulsion polymerization process.

The supplemental polymer is used in the synthesis of a paint binder. Typically, the binder comprises about 0.5 to about 10 weight percent (based upon the total dry weight of the binder) of the supplemental polymer. Preferably, about 1 to about 7, and more preferably about 1.5 to about 5, weight percent (based on the total dry weight of the binder) of the supplemental polymer is present in the binder.

More specifically, the binder of the present invention is made from the supplemental polymer and monomers typically selected from the group consisting of the above described ethylene and vinyl monomers, alkyl acrylate monomers, N-alkyl acrylamide monomers, alkenyl aromatic monomers, and alkadiene monomers.

A characteristic of the binder is that the supplemental polymer is substantially inseparable from the binder by chromatographic means. It is believed that this phenomenon is due to the chain entanglement of the supplemental polymer with other polymeric constituents of the binder. However, the invention is not to be limited to this theoretical interpretation of the invention.

The substantially inseparable characteristic of the binder is important in enhancing the rheological properties of a paint. In particular, paints containing a binder whose constituent supplemental polymer and other polymeric components are separable by chromatographic means (e.g., a paint prepared by blending the supplemental polymer with the other polymeric components of the binder) do not exhibit the same improvement in rheological properties as paints containing a binder having a substantially inseparable combination of the same supplemental polymer and same other polymeric components. Furthermore, because a separate rheology modifier is unnecessary, paints having improved rheology can be formulated in accordance with the present invention without complicating the formulation process and without adversely affecting other latex paint properties.

Typically, the binder is formed by synthesizing the other polymeric components in a reaction and adding the supplemental polymer to the reaction medium during at least a portion of this synthesis procedure. Preferably, the supplemental polymer is added to the reaction medium during about the last 50 percent of the synthesis procedure, and more preferably during the last 25 percent of the synthesis procedure.

More specifically, the binder is prepared by charging water, a surfactant (e.g., anionic and nonionic surfactants), and a buffer (e.g., sodium bicarbonate) into a reactor and then heating the reaction to the desired reaction temperature, for example about 50° to about 90° C., while purging the reactor with an inert gas, e.g. nitrogen. An initiator system is then added to the reactor. The initiator system can be the above described thermally generated free radical sources or a redox system containing an oxidizing agent (e.g., hydrogen peroxide) and a reducing agent (e.g., sodium metabisulfite or erythorbic acid).

The monomers used for forming the other polymeric components of the binder and an additional amount of the initiator system are then simultaneously fed into the reactor. After a period of time, typically at least about 25 percent of the reaction time, the delay feed of the supplemental polymer is commenced. After all the monomers and supplemental polymer have been added to the reactor, the reaction is continued for about 15 minutes to about 1 hour, and post-addition ingredients are then added to the reactor to reduce any residual monomer concentration.

The resulting binder-containing medium, as prepared, typically has a high shear viscosity of at least about 90 cps measured at about 25° C. and about 12,000 sec$^{-1}$ shear rate. Preferably, the binder-containing medium has a high shear viscosity of about 90 to about 1,000 cps measured at about 25° C. and about 12,000 sec$^{-1}$ shear rate. More preferably, the binder-containing medium has a high shear viscosity of about 100 to about 300 cps measured at about 25° C. and about 12,000 sec$^{-1}$ shear rate.

In addition, the binder-containing medium typically has a low shear viscosity of about 100 to about 3,500 cps measured at about 25° C and about 50 sec$^{-1}$ shear rate. Preferably, the binder-containing medium has a low shear viscosity of about 250 to about 1,000 cps measured at about 25° C. and about 50 sec$^{-1}$ shear rate.

The binder of the present invention is most preferably employed in a paint. Usually, paints have a solids content of at least about 50 percent by volume, and more typically about 50 to about 65 percent by volume. Generally, the paint comprises the binder, a pigment, and a carrier, e.g., water. In addition, the paint also typically comprises a coalescing aid, a thickening aid, a dispersing aid, a defoamer, and a biocide.

Depending upon the intended use of the paint, the pigment volume concentration (PVC) of the paint is generally less than about 70, or less than about 45, and even less than about 35. Paints of the present invention typically have a high shear viscosity of about 100 to about 500 cps measured at about 25° C. and about 12,000 sec$^{-1}$ shear rate. Preferably, the paints have a high shear viscosity of about 150 to about 300 cps measured at about 25° C. and about 12,000 sec$^{-1}$ shear rate.

With respect to low shear viscosity, the paint typically has a low shear viscosity of about 65 to about 110 Krebs units measured at about 25° C., and preferably about 80 to about 100 Krebs units measured at about 25° C.

The paint is applied to at least a portion of a surface of a substrate and, when dried, forms a film.

EXAMPLES

The following examples discuss the preparation of exemplary paints within the scope of the present invention. Also, the improved rheology exhibited by these paints is also demonstrated.

EXAMPLE 1

Aqueous Emulsion Supplemental Polymer Synthesis

Water (818 g), Siponate A246L brand anionic surfactant available from Alcolac (19 g), 2-hydroxyethyl acrylate (37 g), itaconic acid (37 g), ethyl acrylate (33 g), and acrylamide (37 g) were charged to a reactor. The contents of the reactor were mixed. While purging the reactor with nitrogen, the reactor was heated to about 90° C. When the reactor reached about 90° C., an initiator solution comprising about 13 g water and about 1.5 g sodium persulfate was added to the reactor. The reaction was continued for about 3 hours and then the reactor was cooled.

EXAMPLES 2–4

Synthesis of Chain-Entangled Binders

In each experiment, a binder was prepared by charging water, Alipal EP-110 brand anionic surfactant available from GAF (about 98 g, 35% active), and sodium bicarbonate (about 3 g) to a reactor. The amount of water charged into the reactor is set forth in Table I, infra.

TABLE I

| Example | Water, g |
|---|---|
| 2 | 426 |
| 3 | 389 |
| 4 | 345 |

The reactor was heated to about 70° C. while purging the reactor with nitrogen. About 19 ml of an initiator solution comprising about 71 g water and about 3.5 g potassium persulfate was then added to the reactor. Afterwards, (i) the remaining portion of the initiator solution and (ii) a monomer mixture containing about 658 g vinyl acetate and about 116 g 2-ethylhexyl acrylate were added to the reactor over a period of about 3 hours. Another feed, comprising about 39 g water and the aqueous emulsion supplemental polymer of Example 1 in the amount stated in the following Table II was simultaneously added to the reactor during about the last 1.5 hours of the addition period.

TABLE II

| Example | Aqueous Supplemental Polymer of Example 1, g | Supplemental Polymer of Example 1, wt % |
|---|---|---|
| 2 | 51 | 1 |
| 3 | 100 | 2 |
| 4 | 150 | 3 |

After the addition of all 3 feeds was finished, the reactor was held at about 70° C. for about the next 30 minutes. Next, two post-addition solutions were added to the reactor. One post-addition solution contained about 7.7 g water and about 0.8 g tert-butyl hydrogen peroxide, and the other post-addition solution contained about 7.7 g water and about 0.8 g hydro AWC brand reducing agent. The reactor was cooled after adding the post-additive solutions.

EXAMPLE 5

Synthesis Of Binder Devoid of Supplemental Polymer

Another binder was prepared by the same procedure set forth in Examples 2–4, supra, with two modifications, namely, the aqueous emulsion supplemental polymer of Example 1 was not added at any time during the synthesis of the binder and the 39 g water added to the reactor in Examples 2–4 over about the last 1.5 hours of the addition period was added to the reactor in Example 5 with the initial reactor charge.

EXAMPLES 6–9

Preparation Of Flat Paints

Four flat paints (having a PVC content of about 60) were prepared. First, separate pastes were made. Each waste was formulated by combining water, Natrosol 250 HR brand hydroxyethyl cellulose, AMP-95 brand base, Tamol 731 brand dispersing aid, Igepal CO-630 brand nonionic surfactant, ethylene glycol, Colloidal 681-F brand defoamer, Super Ad-it brand biocide (available from Huls-America), Tronox CR-801 brand titanium dioxide, Satin Tone #1 brand extender (available from Engelhard), and Snowflake brand extender (available from ECC America) in the proportions set forth in Table III below.

TABLE III

| Material | Paste Weight, g | Volume, ml |
|---|---|---|
| Water | 2131.5 | 2131.4 |
| Natrosol 250 HR | 25.0 | 19.5 |
| AMP-95 | 19.5 | 20.9 |
| Tamol 731 | 27.8 | 25.0 |
| Igepal CO-630 | 16.7 | 15.8 |
| Ethylene Glycol | 103.5 | 92.7 |
| Colloid 681-F | 11.1 | 12.0 |
| Super Ad-it | 5.6 | 5.1 |
| Tronox CR-801 | 1112.5 | 276.6 |
| Satin Tone #1 | 834.4 | 317.4 |
| Snowflake | 1112.5 | 411.9 |

The material combination listed in Table III was dispersed at a high speed to a National Standard rating of about 4. Next, Taxanol brand coalescing aid, Colloidal 681-F brand defoamer, and one of the binders of Examples 2–5 (55% solids) were added to the ground mixture or paste in the proportions stated in Table IV below.

TABLE IV

| Material | Weight, g | Volume, ml |
|---|---|---|
| Texanol | 38.9 | 40.8 |
| Colloid 681-F | 11.1 | 12.0 |
| Binder | 1418.4 | 1312.7 |

Each paint had the formulation and physical properties set forth in Tables V and VI, respectively.

TABLE V

| Paint Formulation | |
|---|---|
| | Weight, g |
| Paste | 196.52 |
| Texanol | 1.42 |
| Colloid 681-F | 0.41 |
| Binder | 51.66 |
| Total Weight | 250 g |
| Total Volume | 170 ml |

TABLE VI

| Physical Properties | |
|---|---|
| Viscosity, KU | 85–95 |
| Density | 12.2 lbs/gal |
| P.V.C. | 60% |
| % Solids | |
| By Weight | 56.3% |
| By Volume | 36.1% |
| pH | 9.5 ± 0.5 |

EXAMPLES 10-13

The high-shear viscosity of each paint formulation was determined using an ICI cone and late viscometer according to the manufacturer's instructions. The results of these tests are set forth in the following Table VII. As shown in Table VII, a paint employing the chain-entangled binder of Examples 3-4 has a high shear or ICI viscosity substantially improved over a paint formulation that only differs in that its binder (namely, the binder of Example 5) is devoid of the supplemental polymer of Example 1.

TABLE VII

| Example | Binder TS. %[a] | pH | Flat Paint ICI Visc[b] |
|---|---|---|---|
| 2 | 55.2 | 4.4 | 152 |
| 3 | 55.1 | 4.0 | 221 |
| 4 | 55.6 | 4.2 | 225 |
| 5 | 55.1 | 4.4 | 165 |

[a]TS % denotes weight percent total solids.
[b]ICI Visc denotes ICI Viscosity measured in cps at about 25° C. and about 12,000 sec$^{-1}$.

Accordingly, as evidenced by the data obtained in Examples 3 and 4, improved ICI viscosity is exhibited by paint formulations incorporating binders prepared by delay-adding a supplemental polymer during the synthesis of the binder or otherwise making the supplemental polymer physically inseparable from the binder.

Although the present invention has been described in considerable detail with reference to certain preferred versions thereof, other versions are possible. For example, a paint can include one or more ingredients that enhance other paint properties. Therefore, the spirit and scope of the appended claims should not necessarily be limited to the description of the preferred embodiments contained herein.

What is claimed is:

1. A paint comprising:
   (i) a binder;
   (ii) a pigment; and
   (iii) a carrier, wherein at least a portion of the binder is a supplemental polymer comprising:
   (a) about 20 to about 60 weight percent of a substantially non-self-polymerizable monomer; and
   (b) about 40 to about 80 weight percent of a copolymerizable monomer having a water-soluble homopolymer, wherein the supplemental polymer is substantially inseparable from the binder by chromatographic means; wherein the non-self-polymerizable monomer has the formula

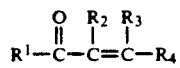

wherein $R_1$ is hydroxy, alkoxy, or amino, $R_2$ is hydrogen or $CH_2COZ_1$, $R_3$ and $R_4$ are independently hydrogen or $COZ_2$ and $Z_1$ and $Z_2$ are independently hydroxy, alkoxy, or amino; the copolymerizable monomer is selected from the group consisting of N-vinyl lactame having the formula

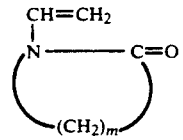

wherein m is an integer from about 3 to about 5; glycol acrylates having the formula

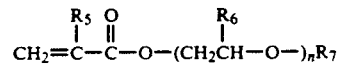

and glycol acrylamides having the formula

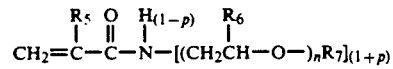

wherein $R_5$ and $R_6$ are independently hydrogen or methyl, $R_7$ is hydrogen or an alkyl group, n is an integer from 1 to about 30, and p is either 0 or 1.

2. The paint of claim 1 wherein the supplemental polymer comprises about 30 to about 50 weight percent of the non-self-polymerizable monomer, and about 50 to about 70 weight percent of the copolymerizable monomer.

3. The paint of claim 1 wherein the binder comprises about 0.5 to about 10 weight percent supplemental polymer.

4. The paint of claim 1 wherein the combined number of amino and carboxylic groups present in the non-self-polymerizable monomer is 1 to 3.

5. The paint of claim 1 wherein each alkoxy moiety contains from 1 to about 8 carbon atoms.

6. The paint of claim 1 wherein $R_1$, $Z_1$, and $Z_2$ are hydroxy, and $R_7$ is hydrogen and n is 1.

7. The paint of claim 1 wherein $R_7$ is an alkyl group containing about 12 to about 24 carbon atoms and n is an integer within the range of about 20 to about 30.

8. The paint of claim 1 wherein the non-self-polymerizable monomer is selected from the group consisting of itaconic acid, maleic acid, fumaric acid, and mixtures thereof; and the copolymerizable monomer is selected from the group consisting of 2-hydroxyethyl acrylate, 2-hydroxyethyl methacrylate, and mixtures thereof.

9. The paint of claim 1 wherein the supplemental polymer further comprises a monomer selected from the group consisting of ethylene, vinyl monomers, alkyl acrylate monomers, N-alkyl acrylamide monomers, alkenyl aromatic monomers, alkadiene monomers, and mixtures thereof.

10. The paint of claim 1 wherein the supplemental polymer further comprises about 1 to about 40 weight percent of a monomer selected from the group consisting of vinyl monomers, alkyl acrylate monomers having the formula

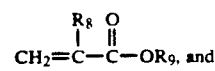

N-alkyl acrylamide monomers having the formula

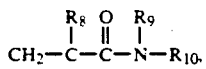

wherein $R_8$ is selected from the group consisting of hydrogen, alkyl groups containing 1 to about 6 carbon atoms, and halo-substituted alkyl groups containing 1 to about 6 carbon atoms, and $R_9$ and $R_{10}$ are each an alkyl group that independently contains up to about 18 carbon atoms, alkenyl aromatic monomers having the formula

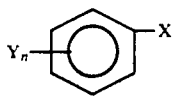

wherein X is an aliphatic radical containing at least one alkenyl bond, Y is a substituent on the aromatic ring, and n is an integer of from 0 to about 5, alkadiene monomers having the formula

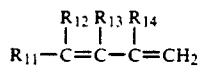

wherein $R_{11}$, $R_{12}$, $R_{13}$, and $R_{14}$ are each independently selected from the group consisting of hydrogen, halogen, and alkyl radicals containing 1 to about 2 carbon atoms, and mixtures thereof.

11. The paint of claim 1 wherein the binder comprises about 1 to about 7 weight percent (based on the total dry weight of the binder) supplemental polymer.

12. The paint of claim 1 wherein the binder is synthesized in a reactor while adding the supplemental polymer to the reactor during at least a portion of the synthesis procedure.

13. The paint of claim 1 having a high shear viscosity of about 100 to about 500 cps measured at about 25° C. and about 12,000 sec$^{-1}$ shear rate, and a low shear viscosity of about 65 to about 110 Krebs units measured at about 25° C.

14. The paint of claim 1 wherein the supplemental polymer comprises:
   (a) about 20 to about 60 weight percent of a substantially non-self-polymerizable monomer;
   (b) about 40 to about 80 weight percent of a homopolymer; and
   (c) up to about 40 weight percent of a monomer selected from the group consisting of ethylene, vinyl monomers, alkyl acrylate monomers, N-alkyl acrylamide monomers, alkenyl aromatic monomers, alkadiene monomers, and mixtures thereof, wherein the monomers of (a)-(c) comprise at least about 95 weight percent of the polymer.

15. A paint comprising:
   (i) a binder;
   (ii) a pigment; and
   (iii) a carrier, wherein at least a portion of the binder is a supplemental polymer comprising:
      (a) about 20 to about 60 weight percent of a substantially non-self-polymerizable monomer; and
      (b) about 40 to about 80 weight percent of a copolymerizable monomer having a water-soluble homopolymer, wherein the binder is synthesized in a reactor while adding the supplemental polymer to the reactor during at least a portion of the synthesis procedure; wherein the non-self-polymerizable monomer has the formula

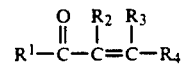

wherein $R_1$ is hydroxy, alkoxy, or amino $R_2$ is hydrogen or $CH_2COZ_1$, $R_3$ and $R_4$ are independently hydrogen or $COZ_2$ and $Z_1$ and $Z_2$ are independently hydroxy, alkoxy, or amino; the copolymerizable monomer is selected from the group consisting of N-vinyl lactams having the formula

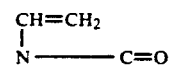

wherein m is an integer from about 3 to about 5; glycol acrylates having the formula

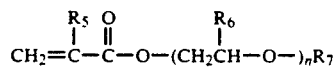

and glycol acrylamides having the formula

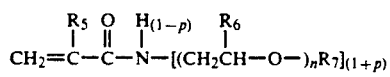

wherein $R_5$ and $R_6$ are independently hydrogen or methyl, $R_7$ is hydrogen or an alkyl group, n is an integer from 1 to about 30, and p is either 0 or 1.

16. The paint of claim 15 wherein the supplemental polymer is added to the reactor during about the last 50 percent of the synthesis procedure.

17. The paint of claim 15 wherein the supplemental polymer is added to the reactor during about the last 25 percent of the synthesis procedure.

18. The paint of claim 1 wherein the supplemental polymer comprises about 35 to about 45 weight percent of the non-self-polymerizable monomer, and about 55 to about 65 weight percent of the copolymerizable monomer.

19. The paint of claim 1 wherein the supplemental polymer comprises:
   (a) about 20 to about 60 weight percent of a substantially non-self-polymerizable monomer;
   (b) about 40 to about 80 weight percent of a copolymerizable monomer having a water-soluble homopolymer; and
   (c) about 1 to about 30 weight percent of a monomer selected from the group consisting of ethylene, vinyl monomers, alkyl acrylate monomers, N-alkyl acrylamide monomers, alkenyl aromatic monomers, alkadiene monomers, and mixtures thereof, wherein the monomer of (a)-(c) comprise at least about 95 weight percent of the polymer.

20. The paint of claim 1 wherein the supplemental polymer comprises:
   (a) about 20 to about 60 weight percent of a substantially non-self-polymerizable monomer;

(b) about 40 to about 80 weight percent of a copolymerizable monomer having a water-soluble homopolymer; and
(c) about 1 to about 30 weight percent of a monomer selected from the group consisting of ethylene, vinyl monomers, alkyl acrylate monomers, N-alkyl acrylamide monomers, alkenyl aromatic monomers, alkadiene monomers, and mixtures thereof, wherein the monomer of (a)-(c) comprise at least about 95 weight percent of the polymer.

21. The paint of claim 1 wherein the binder comprises about 1.5 to about 5 weight percent supplemental polymer.

22. A paint comprising:
(i) a binder;
(ii) a pigment; and
(iii) a carrier, wherein at least a portion of the binder is a supplemental polymer comprising:
 (a) about 20 to about 60 weight percent of a substantially non-self-polymerizable monomer; and
 (b) about 40 to about 80 weight percent of a copolymerizable monomer having a water-soluble homopolymer, the binder being synthesized in a reactor while delay feeding the supplemental polymer to the reactor during at least a portion of the synthesis procedure; wherein the non-self-polymerizable monomer has the formula

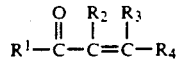

wherein $R_1$ is hydroxy, alkoxy, or amino $R_2$ is hydrogen or $CH_2COZ_1$, $R_3$ and $R_4$ are independently hydrogen or $COZ_2$ and $Z_1$ and $Z_2$ are independently hydroxy, alkoxy, or amino; the copolymerizable monomer is selected from the group consisting of N-vinyl lactams having the formula

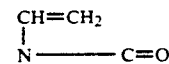

wherein m is an integer from about 3 to about 5; glycol acrylates having the formula

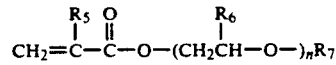

and glycol acrylamides having the formula

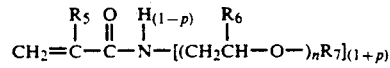

wherein $R_5$ and $R_6$ are independently hydrogen or methyl, $R_7$ is hydrogen or an alkyl group, n is an integer from 1 to about 30, and p is either 0 or 1.

23. The paint of claim 22 wherein the delay feed of the supplemental polymer is commenced after at least about 25 percent of the binder synthesis reaction time.

* * * * *

UNITED STATES PATENT AND TRADEMARK OFFICE
CERTIFICATE OF CORRECTION

PATENT NO. : 5,124,393

DATED : June 23, 1992

INVENTOR(S) : David M. Ingle and Gaylen M. Knutson

It is certified that error appears in the above-identified patent and that said Letters Patent is hereby corrected as shown below:

Claim 1, column 9, line 67, replace "lactame" with -- lactams --.

Claim 3, column 10, line 33, after "percent" insert -- (based on the total dry weight of the binder) --.

Claim 14, column 11, line 48, after "of a" insert -- copolymerizable monomer having a water-soluble --.

Claim 15, column 12, lines 19 and 20, replace

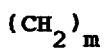

with

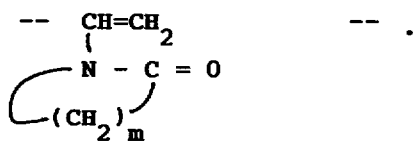

Claim 20, column 13, line 4, replace "30" with -- 25 --.

UNITED STATES PATENT AND TRADEMARK OFFICE
CERTIFICATE OF CORRECTION

PATENT NO. : 5,124,393

DATED : June 23, 1992

INVENTOR(S) : David M. Ingle and Gaylen M. Knutson

It is certified that error appears in the above-identified patent and that said Letters Patent is hereby corrected as shown below:

Claim 20, column 13, line 10, replace "95" with -- 98 --.

Claim 21, column 13, line 12, after "percent" insert -- (based on the total dry weight of the binder) --.

Claim 22, column 14, lines 10 and 11, replace

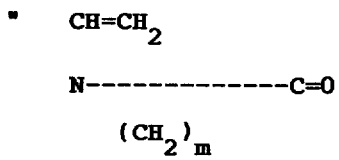

with

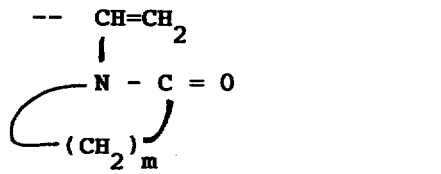

Signed and Sealed this

Twentieth Day of July, 1993

*Attest:*

MICHAEL K. KIRK

*Attesting Officer*    *Acting Commissioner of Patents and Trademarks*